No. 758,675. PATENTED MAY 3, 1904.
A. MEUSER & C. G. ARTHUR.
METALLIC PACKING.
APPLICATION FILED AUG. 13, 1903.
NO MODEL.
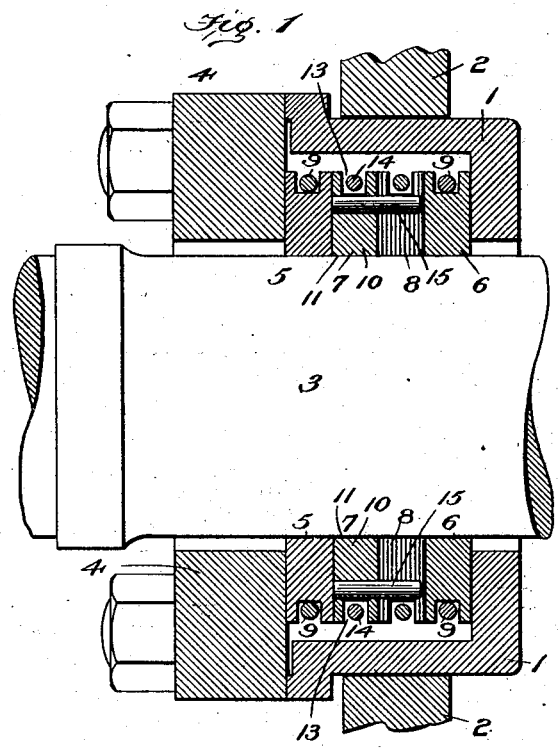
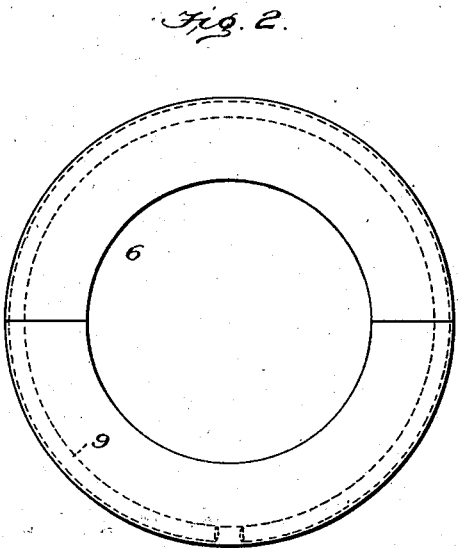
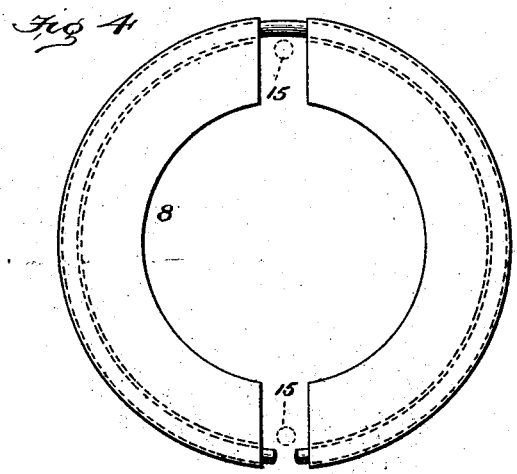
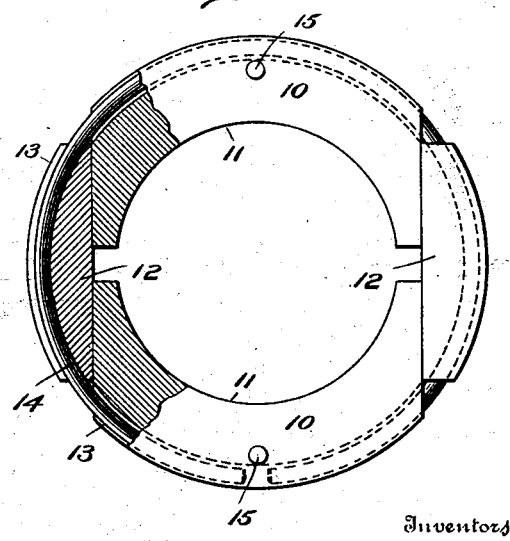
Witnesses
Edwin L. Bradford
A. Kaufman
Inventors
Alfonso Meuser and
Charles G. Arthur
By A. E. Glanneck
Attorney No. 758,675. Patented May 3, 1904.

UNITED STATES PATENT OFFICE.

ALFONSO MEUSER, OF CHICAGO, ILLINOIS, AND CHARLES G. ARTHUR, OF COLUMBIA, SOUTH CAROLINA, ASSIGNORS OF ONE-HALF TO JOHN F. SHEAHAN, OF COLUMBIA, SOUTH CAROLINA.

METALLIC PACKING.

SPECIFICATION forming part of Letters Patent No. 758,675, dated May 3, 1904.

Application filed August 13, 1903. Serial No. 169,391. (No model.)

*To all whom it may concern:*

Be it known that we, ALFONSO MEUSER, residing at Chicago, in the county of Cook and State of Illinois, and CHARLES G. ARTHUR, residing at Columbia, county of Richland, State of South Carolina, citizens of the United States, have invented new and useful Improvements in Metallic Packing-Rings for Piston-Rods, &c., of which the following is a specification.

This invention has relation to metallic packing-rings for reciprocating piston-rods, &c.; and it consists in the novel construction and arrangement of its parts, as hereinafter described.

The object of the invention is to provide a packing consisting of segmental packing-rings, the segments being so formed and located upon the rod and with relation to each other that the pressure of the steam forces them in close contact with the rod, and when such pressure is removed the rod is relieved of all tension through the said segments, and when the said rod is operating vertically it is also relieved of all friction from the said segments. The said segments consist of primary and secondary members, the first of which have rod-bearings and the second are adapted to bear against the primary segments, but do not come in contact with the rod. A means is provided for holding the segments in proper positions with relation to each other, said means coming in contact with the secondary segments, but permitting the primary segments to have a play, the advantage of which is the secondary segments are at all times, whether under steam-pressure or not, held in close contact with the primary segments, thus leaving no joints open for the escape of steam or other pressure, which is especially required when the steam-pressure is first being applied at the beginning of the piston-stroke.

The further object of the invention is to provide segmental chafing-rings which are adapted to encircle the rod, the advantage of which is that the said rings may be applied to rods with enlarged ends next the cross-head and will be held in close proximity to the rod all around, thus protecting the packing-rings from undue wear and foreign matter from the exterior of the cylinder.

The further object and advantage is that the chafing-rings may be applied or renewed without disconnecting the cross-head from the rod.

A means is provided for holding the ends of the segments of the chafing-ring in hard contact with each other, which forms a closed joint, preventing the escape of steam or other pressure. Said means does not exert any tension upon the rod. Consequently the latter is free to reciprocate through the chafing-rings without friction.

In the accompanying drawings, Figure 1 is a vertical sectional view of the packing. Fig. 2 is a face view of one of the chafing-rings. Fig. 3 is a face view, partly in section, of the primary packing-ring. Fig. 4 is a face view of the secondary packing-ring.

The packing-box 1 is suitably attached to the cylinder-head 2, the piston-rod 3 passing through the said packing-box. It will be observed that the perforations in the packing-box 1 and the packing-box gland 4, through which the piston-rod 3 passes, are greater in diameter than the said rod. Consequently the said rod may have a slight lateral or vertical play with relation to the packing-box, and the wear from such play will be taken up by the chafing-rings 5 and 6, thereby relieving the packing-rings 7 and 8 and prolonging their usefulness.

The chafing-rings 5 and 6 encircle the piston-rod 3 and fit closely against the same. Said chafing-rings are identical in their construction, and each is made up of segments with their ends coming in close contact with each other. The specific means employed for holding the segments in such positions consists of a spring 9, located in peripheral grooves of the said segments, said spring bearing against the said segments along its entire length and having a space between its ends, so that the said spring may at all times exert a tension upon the segments.

The primary packing-ring 7 encircles the piston-rod 3 and fits at one face against the face of the chafing-ring 5 and at its opposite face against the secondary packing-ring 8. The outer side of the said ring 8 bears against the face of the chafing-ring 6, the outer face of which is next to the bottom of the packing-box 1.

The packing-ring 7 is composed of the primary segments 10 10, each having a rod-bearing or face 11, and the secondary segments 12, which bear against the ends of the said primary segments.

As shown in Fig. 3, the outer edges of the segments 10 are formed on the arc of a circle, while the outer edges of the segments 12 are formed on the arc of a circle having the same radius as that of the arc describing the edges of the segments 10, but from different centers, so that the outer edges of the segments 12 are a little out or beyond the line of the edges of the segments 10. In the form of the invention as shown the outer edges of the segment constituting the ring 7 are peripherally grooved, as at 13, and the ring 14 is located in the said groove. Said ring 14 bears against the segments 12 and keeps them in close contact with the ends of the segments 10, but permits the said segments 10 to have a slight play. Thus a flexible ring is formed, and the joints are held in close contact, which is especially advantageous when the steam-pressure is first being applied.

The supplemental packing-ring is made up of segments which encircle the rod 3. Said segments are held in place by any suitable means. The ring 7 is provided with the pins 15, which extend between the ends of the segments constituting the ring 8, thus retaining the solid portions 4, one said packing-ring opposite the joints between the segments of the other, and vice versa.

The means for holding the segments of the ring 7 in proper positions with relation to each other may be changed or altered in construction without departing from the spirit of the invention so long as the contact is made between said means with the segments 12 and the segments 10 are permitted to have a play.

Thus a perforated band, cylinder, or ring which will incase the said packing-rings may be used.

Having described our invention, what we claim as new, and desire to secure by Letters Patent, is—

1. A packing consisting of rings surrounding a rod and a segmental chafing-ring also surrounding the rod and bearing against the first said rings, and a spring encircling the segments of said chafing-ring and having a space between its ends and bearing against the segments and confining the ends thereof against each other.

2. A packing consisting of rings surrounding a rod and a segmental chafing-ring also surrounding the rod and having flat and parallel opposite faces and bearing against the first said rings.

3. In a packing, a ring having primary and secondary segments encircling a rod, the outer edges of the primary segments describing arcs, the outer edges of the secondary segments also describing arcs struck from the same radius as that of the primary segments but from different centers, and a means for holding all said segments in proper positions with relation to each other bearing against the secondary segments and permitting the primary segments to have a play.

4. A packing consisting of packing-rings located within a packing-box and surrounding a rod, a segmental chafing-ring interposed directly between said packing-rings and the bottom of the packing-box and a segmental chafing-ring interposed directly between said packing-rings and the packing-box gland.

In testimony whereof we affix our signatures in presence of witnesses.

ALFONSO MEUSER.
CHARLES G. ARTHUR.

Witnesses for Alfonso Meuser:
  A. E. GLASCOCK,
  A. KAUFMAN.
Witnesses for C. G. Arthur:
  T. B. HAYNES,
  J. F. L. HABENICHT.